United States Patent Office 3,614,837
Patented Oct. 26, 1971

3,614,837
APPARATUS FOR DREDGING AND SIFTING MUD, SANDS OR GRAVEL
Toshinobu Araoka, 1308 Oaza-Orio, Yahata-ku, Kitakyushu, Fukuoka Prefecture, Japan
Filed June 5, 1969, Ser. No. 830,747
Claims priority, application Japan, June 13, 1968, 43/50,509; July 9, 1968, 43/48,623; Sept. 2, 1968, 43/63,539, 43/76,520
Int. Cl. E02f 3/92, 3/94
U.S. Cl. 37—57                              1 Claim

ABSTRACT OF THE DISCLOSURE

A device for dredging up and sifting mud, sand and gravel, which device comprises a boom that can be dipped into water from aboard a ship or from the land, a scoop-carrying drum rotatably mounted on the end of the ladder, scoops on the periphery of the drum, a collecting space within the drum and partitioned from each scoop by means of a screen, and a suction pipe one end of which opens to the collecting space through one side of the drum while its other end projects above the surface of the water.

SUMMARY OF THE INVENTION

The present invention relates to a device for scooping mud, sand and gravel out of water and for sifting them underwater.

In the conventional method of dredging up mud, sand or gravel from underwater and bringing them to a workship or a worksite on the land, these materials are first scooped up out of the water, collected on the land, sifted, and then transported to the worksite. Such operation requires large, complicated equipment and is inefficient, because it comprises several distinct steps.

In the device according to the present invention, a scoop-carrying drum is rotatably mounted on the end of a boom that can be dipped into the water from aboard a ship or from the land, a screen partitions each scoop on the periphery of the drum from a collecting space within the said drum, each scoop communicates with the collecting space, and the inlet end of a suction pipe is connected to the collecting space at one side of the drum, while the other end of the suction pump projects above the surface of the water.

The primary object of the present invention is to provide an arrangement which makes it possible for a single rotating mechanism to carry out all the steps of scooping, sifting and transporting mud, sand or gravel, thereby eliminating the drawbacks of the conventional equipment and bringing about an extremely efficiet operation.

The other objects of the present invention will be better understood from the following description of several embodiments of the present invention, with reference to the accompanying drawings in which.

Figure 1:
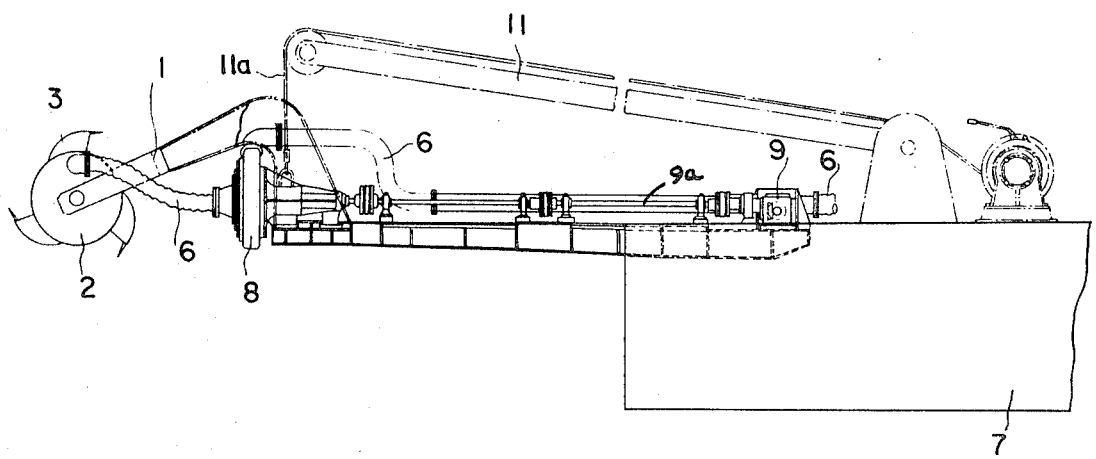
FIG. 1 is a side view of a device according to the present invention.
Figure 2:
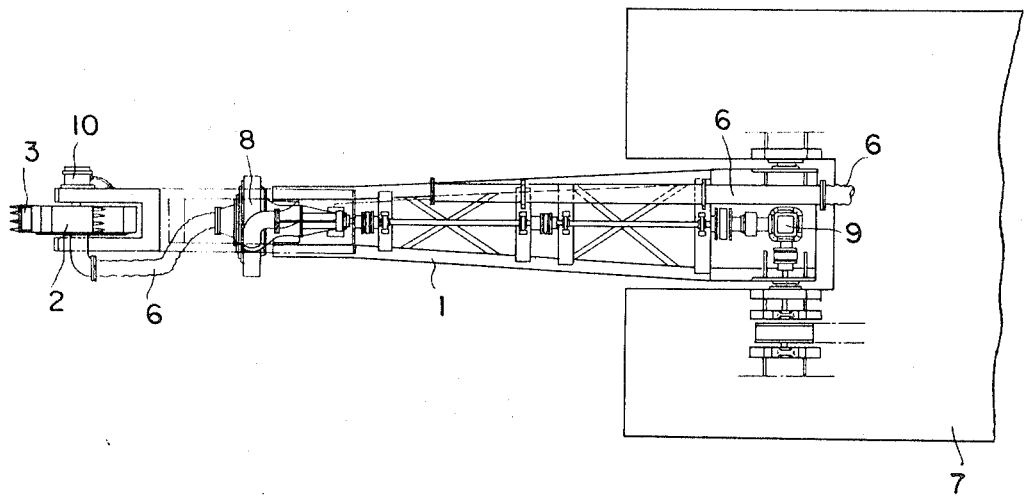
FIG. 2 is a plan view of a device according to the present invention with the boom-lifting mechanism omitted.
Figure 3:
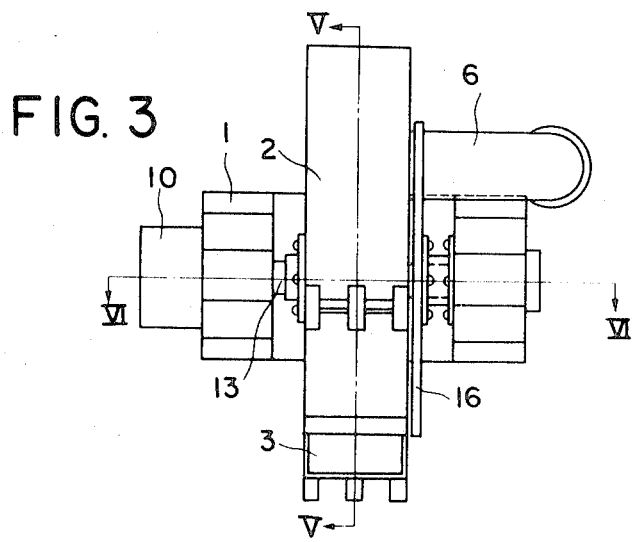
FIG. 3 is a front elevation of a scoop-carrying drum in a first embodiment.
Figure 4:
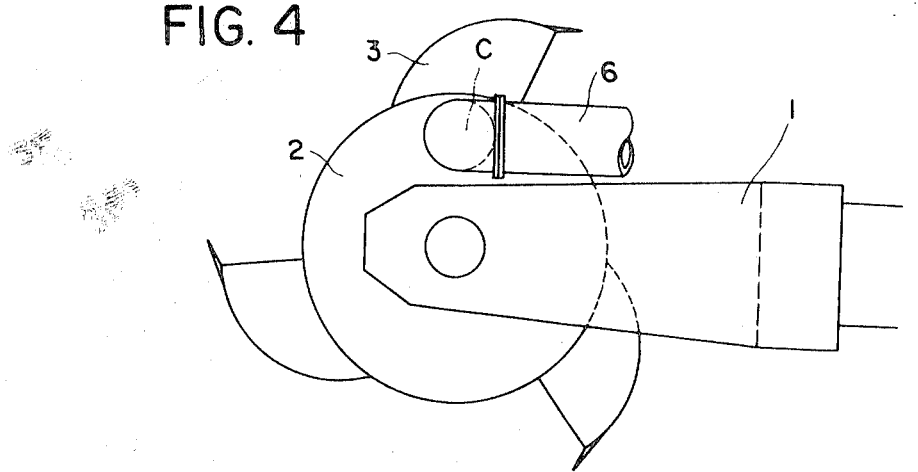
FIG. 4 is a side view of the drum illustrated in FIG. 3.
Figure 5:
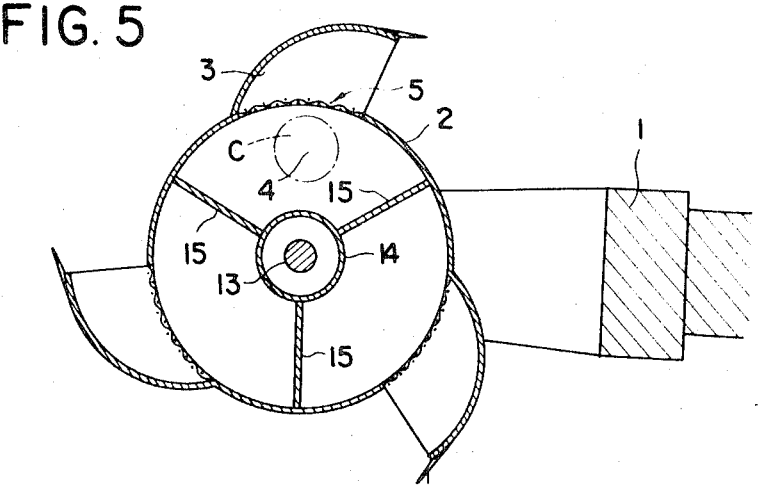
FIG. 5 is a section taken along the line V—V of FIG. 3.
Figure 6:
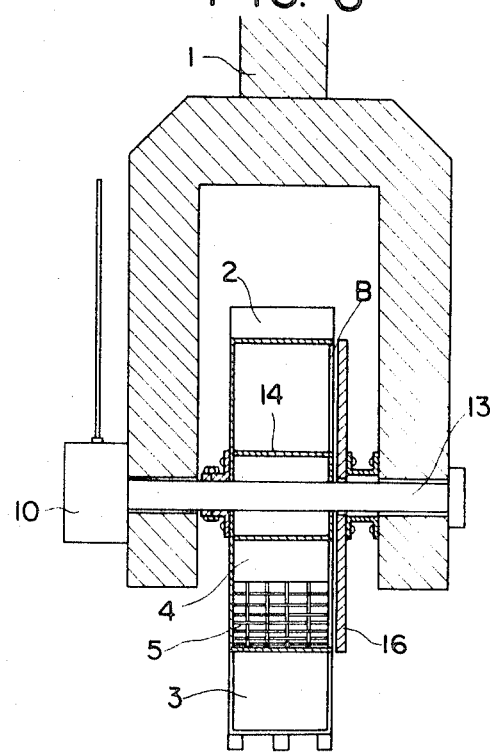
FIG. 6 is a section taken along the line VI—VI of FIG. 3.
Figure 7:
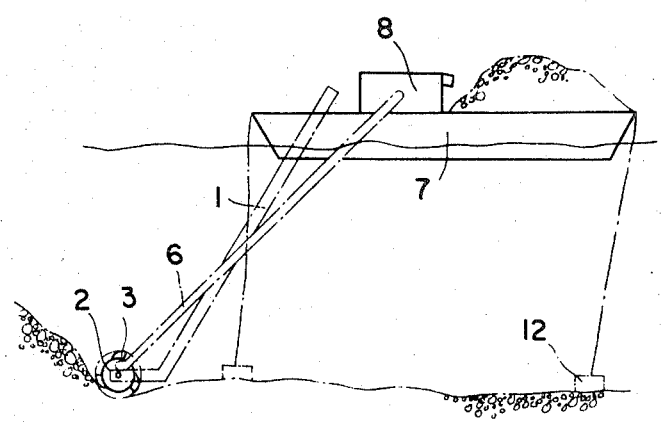
FIG. 7 is a schematic view showing the operation of the device according to the present invention.

Referring first to FIGS. 1–7, the device comprises a boom which can be dipped freely into the water from aboard a ship or from the land. A scoop-carrying drum 2 is rotatably mounted on a shaft 13 at the end of the boom 1. The drum 2 is equipped with a plurality of scoops 3. A collecting space 4 defined by a small-diameter drum 14 within the scoop-carrying drum 2 and by the scoop-carrying drum is divided into three parts by the partitions 15. This collecting space 4 communicates with each scoop 3 through a screen 5. As shown in FIG. 6, one side of the collecting space 4 is open as indicated at B and this opening is covered by a stationary board 16 fixed on the boom. The stationary board 16 is provided with a suction hole c (FIG. 5) at an eccentric position on one side of the shovel-carrying drum, facing the collecting space 4, and the suction hole c is connected with the end of a suction pipe 6. A suction pump 8 is provided midway of the suction pipe 6, the suction pump being driven by a rotating mechanism 9 through a shaft 9a.

The scoop-carrying drum 2 is driven by a submersible motor 10 connected to a shaft 13. This operation can be carried out from aboard a ship or from the land.

The boom 1 is suspended from a hoist 11. When a cable 11a is payed out, the boom 1 dips into the water. When the scoop-carrying drum 2 is lowered to a desired river bottom or the like, and the submersible motor 10 is started, the scoop-carrying drum 2 begins to rotate with all the scoops on its periphery turning to successively scoop up the mud, sand or gravel from the bottom. Material scooped up by the scoops passes into the collecting space 4 in the drum while being sifted by the screen 5. If at the same time the suction pump is started, the scooped mud and sand in the collecting space will be sucked into the suction pipe and steadily transported out of the water. Those materials which cannot pass through the screen 5 will remain in the scoops and will be dumped back into the water as the scoop-carrying drum rotates. Thus, the device according to the present invention is capable of simultaneously scooping up and sifting sand, gravel and the like. Besides, with the suction hole being located at an eccentric position on the side of the scoop-carrying drum, the rotating mechanism is not unreasonably strained and an extremely strong suction takes place with the result that the operation can be done with high efficiency and the gravel and the like can be continuously withdrawn from the water.

Figure 8:
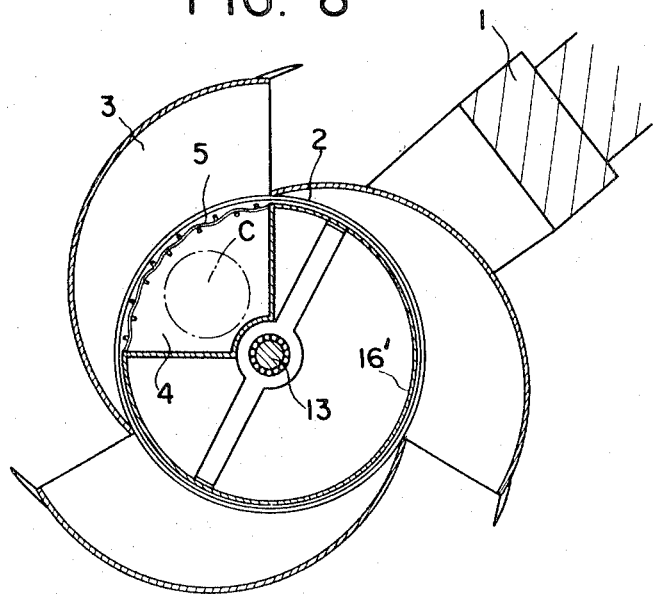
FIG. 8 is a radial section of the scoop-carrying drum in a second embodiment.

In the second embodiment illustrated in FIG. 8, instead of the stationary board 16 in the first embodiment a stationary drum 16' mounted on the boom registers with an opening the shovel-carrying drum 2 which corresponds to the opening B shown in FIG. 6. This stationary drum 16' has a single peripheral opening, over which a screen 5 is stretched. Beneath this opening is an enclosed collecting space 4. In the same way as in the first embodiment a suction pipe is connected to the collecting space 4. Thus, as the scoop-carrying drum 2 is rotated, the scoop loaded with scooped gravel and the like, upon reaching a certain point during its rotation, assumes a bottomless position. The gravel and the like on the shovel then drops through the screen 5 into the collecting space 4 to be drawn off through the suction pipe.

Figure 9:
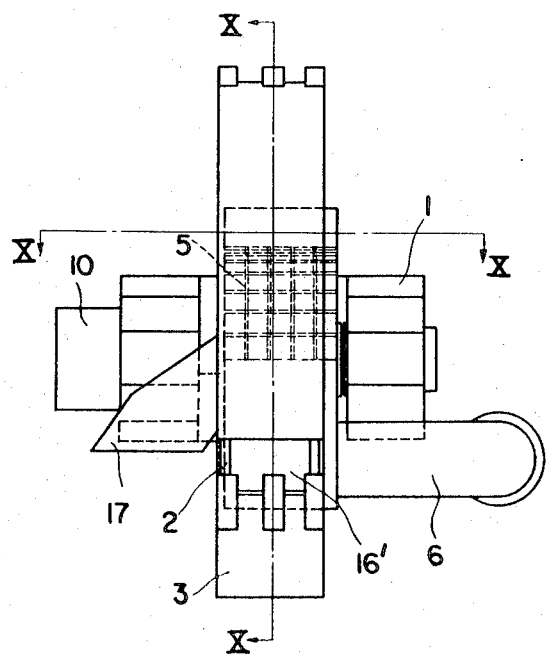
FIG. 9 is a front elevation of the scoop-carrying drum in a third embodiment.
Figure 10:
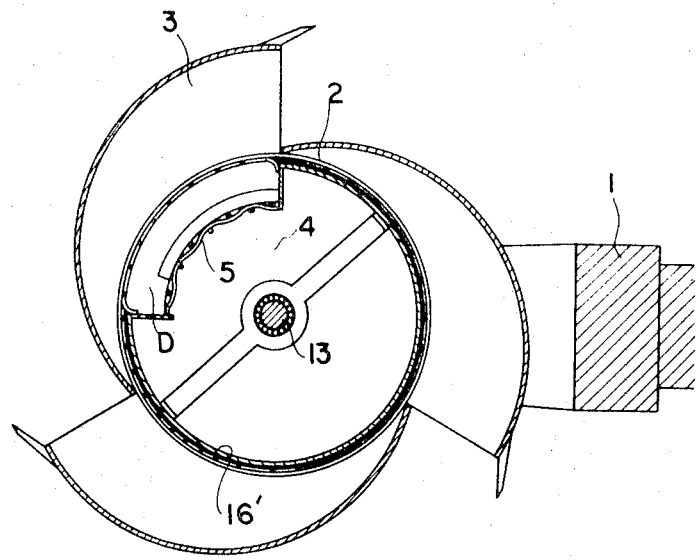
FIG. 10 is a section taken along the line X—X of FIG. 9.

In the third embodiment illustrated in FIGS. 9 and 10, the periphery of the stationary drum 16' of the preceding embodiment is partially recessed and a screen 5 is stretched across said recess. One side of the recess D is open and a discharge duct 17 juts out sidewise therefrom. Materials that cannot pass the screen are discharged through this duct out of the stationary drum.

Figure 11:
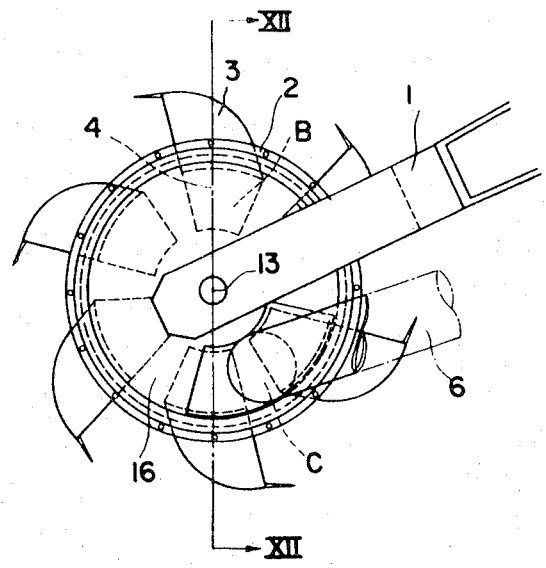
FIG. 11 is a side view of a scoop-carrying drum in a fourth embodiment.
Figure 12:
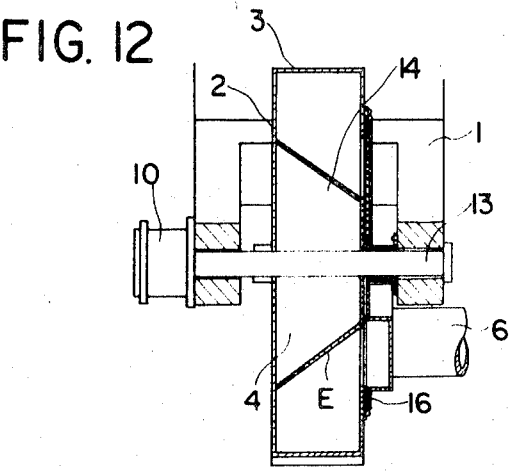
FIG. 12 is a section taken along the line XII—XII of FIG. 11.

In the fourth embodiment illustrated in FIGS. 11 and 12, the internal drum 14 of the first embodiment is made larger, and assumes the shape of a truncated cone with its top on the suction side and an inclined surface E, thereby smoothing the flow into the suction hole c, i.e., into the suction pipe 6. A screen is installed in front of each shovel.

Figure 13:
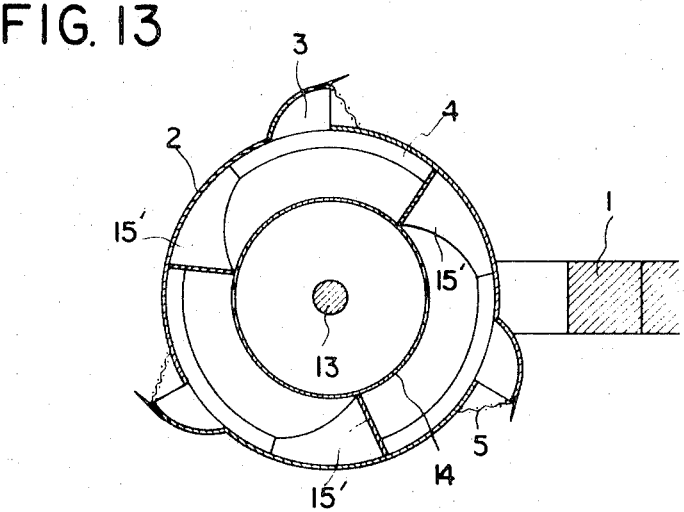
FIG. 13 is a side view of a scoop-carrying drum in a fifth embodiment.

In the fifth embodiment illustrated in FIG. 13, sectional wall 15' is installed in a spiral position axially of the internal drum 14 of the fourth embodiment. The sectional walls of this arrangement further promote the smooth flow of gravels and the like into the suction hole.

Figure 14:
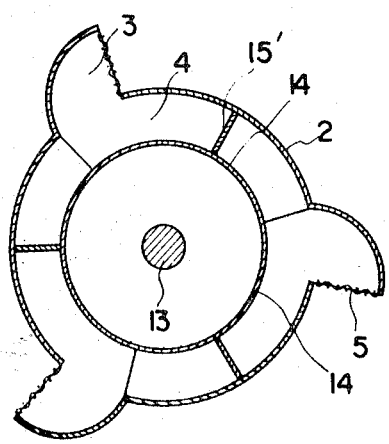
FIG. 14 is a radial section of a scoop-carrying drum in a sixth embodiment.

In the sixth embodiment illustrated in FIG. 14, the diameter of the internal drum 14 in the first embodiment is enlarged and the wheel is equipped with sectional walls 15' in a spiral position.

Figure 15:
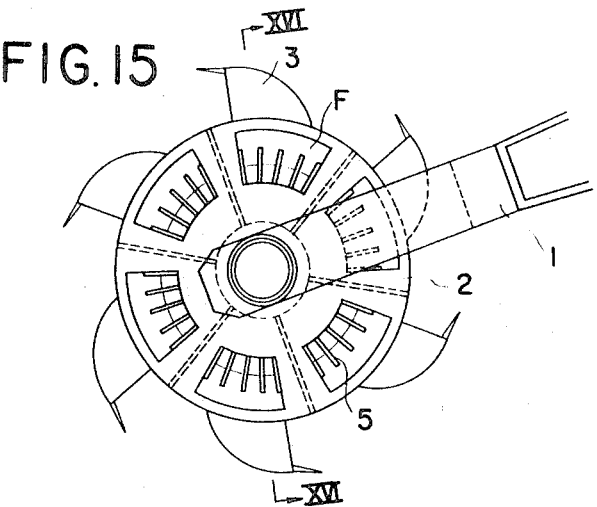
FIG. 15 is a side view of a scoop-carrying drum in a seventh embodiment.
Figure 16:
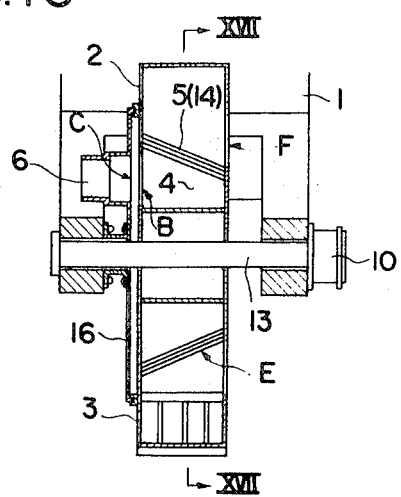
FIG. 16 is a section taken along the line XVI—XVI of FIG. 15.
Figure 17:
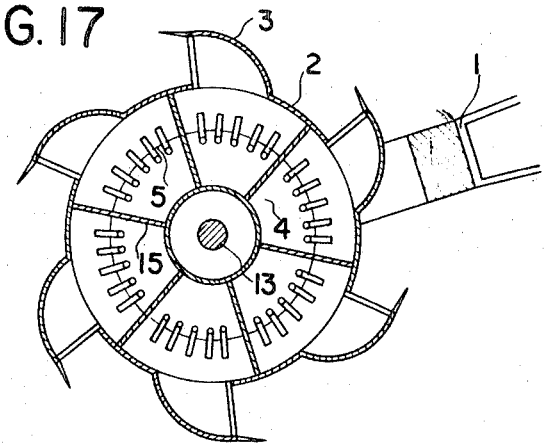
FIG. 17 is a section taken along the line XVII—XVII of FIG. 16.

In the seventh embodiment shown in FIGS. 15–17, the collecting space 4 within the scoop-carrying drum is partitioned by an axial frusto-conical screen 5, discharge holes F are provided along the side of the drum 2 between the drum 2 and screens 5 and a suction hole c is also provided on the side of the drum 2 between the screens 5 and the bottom of the collecting space 4. In this arrangement the materials rejected by the screens 5 pass out through the discharge holes F.

It goes without saying that in all of the foregoing embodiments the sectional walls 15 and 15' partitioning the collecting space can be dispensed with.

What is claimed is:

1. A dredge comprising a boom, a hollow drum rotatably mounted at one end of said boom and enclosing an internal collecting space, a co-axial frusto-conical drum within said collecting space which defines an inclined surface sloping toward one end of said hollow drum, a plurality of partitions dividing the space between said drums into compartments, said partitions being spirally mounted about the axis of said drums and said hollow drum being provided with peripheral openings and carrying scoops near said openings which project outwardly therefrom, screens positioned to restrict the admission of material through said openings into said collecting space, and a stationary suction pipe at said one end of said hollow drum positioned to draw material from each of said compartments successively as said hollow drum is rotated past said pipe.

References Cited

UNITED STATES PATENTS

| | | | |
|---|---|---|---|
| 388,252 | 8/1888 | Bowers | 37—66 |
| 813,252 | 2/1906 | Strom | 37—66 |
| 903,210 | 11/1908 | Lkiericz | 37—66 |
| 3,020,656 | 2/1962 | Linden | 37—190 |
| 3,476,498 | 11/1969 | Von Bolhar | 37—66 X |

FOREIGN PATENTS

| | | |
|---|---|---|
| 692,832 | 6/1940 | Germany. |
| 763,672 | 3/1954 | Germany. |
| 936,799 | 12/1955 | Germany. |

ROBERT E. PULFREY, Primary Examiner

C. D. CROWDER, Assistant Examiner

U.S. Cl. X.R.

37—66, 189